(12) United States Patent
Pulkkinen et al.

(10) Patent No.: US 8,140,650 B2
(45) Date of Patent: Mar. 20, 2012

(54) USE OF CONFIGURATIONS IN DEVICE WITH MULTIPLE CONFIGURATIONS

(75) Inventors: Markku Pulkkinen, Oulu (FI); Martti Lindroos, Oulu (FI)

(73) Assignee: Nokia Corporation, Espoo (FI)

( * ) Notice: Subject to any disclaimer, the term of this patent is extended or adjusted under 35 U.S.C. 154(b) by 813 days.

(21) Appl. No.: 11/794,421

(22) PCT Filed: Dec. 30, 2004

(86) PCT No.: PCT/FI2004/000810
§ 371 (c)(1),
(2), (4) Date: Jun. 27, 2007

(87) PCT Pub. No.: WO2006/070045
PCT Pub. Date: Jul. 6, 2006

(65) Prior Publication Data
US 2008/0104207 A1 May 1, 2008

(51) Int. Cl.
*G06F 15/177* (2006.01)
(52) U.S. Cl. ........ 709/220; 709/217; 709/218; 709/219; 709/221; 709/222
(58) Field of Classification Search ........... 709/217–222
See application file for complete search history.

(56) References Cited

U.S. PATENT DOCUMENTS

| | | | |
|---|---|---|---|
| 6,272,632 B1 * | 8/2001 | Carman et al. | 713/168 |
| 7,136,903 B1 * | 11/2006 | Phillips et al. | 709/217 |
| 7,269,602 B2 * | 9/2007 | Kaappa | 1/1 |
| 7,269,821 B2 * | 9/2007 | Sahinoja et al. | 717/106 |
| 7,386,299 B2 | 6/2008 | Nakamura | |
| 7,403,770 B2 | 7/2008 | Hayashi | |
| 7,483,690 B2 | 1/2009 | Muramatsu et al. | |
| 7,743,407 B2 * | 6/2010 | Sprigg et al. | 726/4 |
| 2003/0051169 A1 | 3/2003 | Sprigg et al. | |
| 2003/0103484 A1 | 6/2003 | Oommen et al. | |
| 2003/0204640 A1 | 10/2003 | Sahinoja et al. | |
| 2004/0123147 A1 | 6/2004 | White | |
| 2004/0158583 A1 | 8/2004 | Kaappa | |
| 2005/0091346 A1 * | 4/2005 | Krishnaswami et al. | 709/220 |
| 2006/0173974 A1 * | 8/2006 | Tang | 709/217 |
| 2007/0198656 A1 * | 8/2007 | Mazzaferri et al. | 709/218 |

(Continued)

FOREIGN PATENT DOCUMENTS

EP 1 473 873 11/2004
(Continued)

OTHER PUBLICATIONS

2003, "*SyncML Device Management Protocol*", Open Mobile Alliance, version 1.1.2, Dec. 12, 2003, 41 pages.

(Continued)

*Primary Examiner* — Krisna Lim
(74) *Attorney, Agent, or Firm* — Hollingsworth & Funk, LLC

(57) ABSTRACT

The invention relates to a method for arranging use of configurations in a device with multiple configuration data sets manageable by one or more external managing entities. The device comprises access control information originated and/or controlled by an external managing entity for defining a right to access a configuration data set. The access control information is checked in response to an indication from an application requiring access to a configuration data set. If the application is, on the basis of the access control information, entitled to access the configuration data set, access to the configuration data set is arranged for the application.

30 Claims, 3 Drawing Sheets

U.S. PATENT DOCUMENTS

2007/0233687 A1* 10/2007 Iwase .................................. 707/9

FOREIGN PATENT DOCUMENTS

| JP | 2003283494 | 10/2003 |
| JP | 2004139396 | 5/2004 |
| JP | 2004363925 | 12/2004 |
| WO | WO02071786 | 9/2002 |
| WO | 03/079216 | 9/2003 |
| WO | WO2004/017608 | 2/2004 |

OTHER PUBLICATIONS

2003, "*SyncML Device Management Tree and Description*", Open Mobile Alliance, version 1.1.2, Dec. 2, 2003, 44 pages.

2003, "*SyncML Representation Protocol Device Management Usage*", Open Mobile Source Alliance, version 1.1.2, Jun. 12, 2003, 39 pages.

2002, "*Provisioning Architecture Overview*", Open Mobile Alliance, version 1.1, Nov. 12, 2002, 20 pages.

2003, "*Mobile Device Management—For Microsoft® Windows® Powered Smartphone 2002 and Pocket PC 2002*", Microsoft Corporation, Phone Edition, Jan. 2003, 58 pages.

Office Action dated Jun. 30, 2009 from parallel Canadian Application No. 2,592,702, 3 pages.

Translated Office Action dated Nov. 30, 2010 from Japanese Application No. 2007-548846, 5 pages.

Translated Office Action dated Jul. 12, 2011 from Japanese Application No. 2007-548846, 3 pages.

Microsoft, "Application Design Process", Microsoft TechNet, Jul. 31, 2004, 8 pages.

\* cited by examiner

USE OF CONFIGURATIONS IN DEVICE WITH MULTIPLE CONFIGURATIONS

FIELD OF THE INVENTION

The invention relates to arranging use of configurations in devices with multiple configurations, more specifically to arranging access control into configuration data sets manageable by one or more external management devices.

BACKGROUND OF THE INVENTION

As different data processing devices, such as mobile stations, become more complex, the significance of device management becomes more pronounced. Devices require several different settings, such as settings related to Internet access points, and it is arduous and difficult for a user to set them manually. To solve this problem, device management solutions have been developed so that the administrator of a company's information system or a teleoperator can set an appropriate configuration in the device. Device management generally refers to actions by which a person not using the device can change the configuration of the device; for instance change the settings or even a protocol used by the device. In addition to device-specific settings, it is also possible to transmit user-specific data, such as user profiles, logos, ringing tones, and menus with which the user can personally modify the settings of the device, or the modification takes place automatically in connection with device management.

One of the device management standards is OMA (Open Mobile Alliance) DM (Device management), which is partly based on the SyncML (Synchronization Markup Language) protocol. For instance, a personal computer (PC) may act as a device management server in a device management protocol, and a mobile station as a device management client. The items managed in the device management client are arranged as management objects. The management objects are entities that can be managed by server management commands in the device management client. The management object can for instance be a number or a large entity, such as a background image or a screensaver. In OMA device management, the management objects are arranged in a management tree.

Some typical manageable items comprise operator specific connection settings, for instance GPRS (General Packet Radio Service) connection settings. By OMA DM procedures, these operator specific sets of settings, which may also be referred to as configurations, in a user terminal device can be maintained by an operator controlled management server. For instance, WAP (Wireless Application Protocol) settings for using WAP services of a service provider may be provisioned as a configuration context for the terminal device.

Some managed items may comprise user specific and controlled information, such as screen savers and ringing tones. Further, the device may be used for accessing a corporate information system, for instance a file system, intranet pages and an e-mail system therein. For this purpose the device needs to comprise one or more configurations for arranging access to these corporate information system services. For security purposes it is desirable for corporate IT personnel to be able to control these settings. Therefore, a device may comprise multiple configurations from different managing parties and it should be possible to enable access to a specific configuration only for an authorized management party. In accordance with the OMA DM protocol, specified in OMA specification "*SyncML Device Management Protocol*", version 1.1.2, 12 Dec. 2003, 41 pages, in the set-up phase of a management session, a management server is authenticated on the basis of credentials received from the management server. Further, as illustrated in OMA specification "*SyncML Management Tree and Description*", version 1.1.2, 2 Dec. 2003, 44 pages, a node of a management tree may be specified by an access control list (ACL) comprising a list of identifiers and access rights associated with each identifier. As described in Chapter 7.7.1, the access rights granted by ACL define management server identifiers authorized to get, add, replace, and/or remove a node. Thus, different access rights may be given to various device management servers, and device management commands from non-entitled management servers are not performed on the management tree. However, besides a capability to control access of management servers to nodes of a management tree, a general need further exists to limit the use of the configurations in the device. For instance, companies wish to control terminals used for accessing company IT services in a better way in order to protect corporate data and services.

BRIEF DESCRIPTION OF THE INVENTION

A method, a device management system, data processing devices, and a computer program product are now provided, which are characterized by what is stated in the independent claims. Some embodiments of the invention are described in the dependent claims.

According to an aspect of the invention, a device with multiple configuration data sets comprises access control information originated and/or controlled by an external managing entity for defining a right of an application to access a configuration data set. The access control information is checked in response to an indication from an application requiring access to a configuration data set. If the application is, on the basis of the access control information, entitled to access the configuration data set, access to the configuration data set is arranged for the application.

The term "configuration data set" generally refers to a set of data comprising configuration information having direct or indirect effect on one or more functions of the device or an application in the device. For instance, the configuration data set may comprise an IP address or a domain name of a server on the basis of which a connection is arranged from the device.

The invention makes it possible to control access of applications to configuration data. More particularly, access rights may be specified and/or controlled by an external entity. A device may comprise multiple configuration data sets with different access control properties. For instance, a configuration data set specifying access settings for a corporate information system may be controlled by configuration management software operated by corporate IT personnel.

According to an embodiment, at least one service context is stored in the device, wherein the service context comprises at least the configuration data set. Access to the service context is allowed for the application on the basis of the access control information only if the application is, by the external managing entity, predetermined in access control information associated with the service context. Various usage contexts, possibly comprising also non-settings related data, such as user related data stored by an application in the device, may then be provided in the device.

BRIEF DESCRIPTION OF THE FIGURES

The invention is now described in greater detail by means of some embodiments and with reference to the attached drawings, in which.

DETAILED DESCRIPTION OF SOME
EMBODIMENTS OF THE INVENTION

One embodiment of the invention will be described in the following in a system supporting OMA device management; it should, however, be noted that the invention can be applied to any device management system in which configurations in a managed device may be managed by an external management entity.

Figure 1:
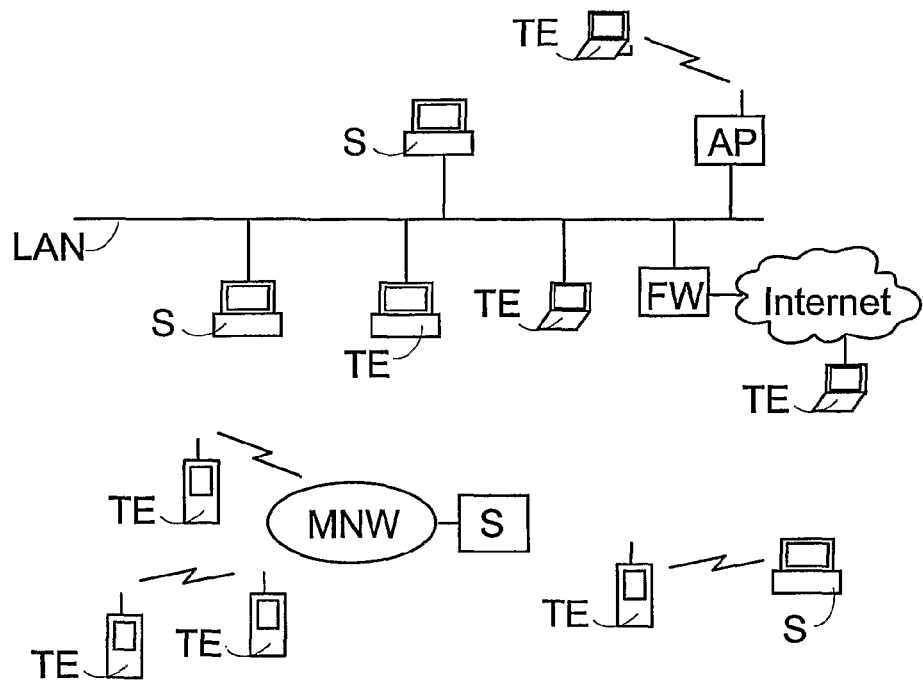
FIG. 1 illustrates a management system.

FIG. 1 illustrates a networked system. A network server or a PC typically serves as a server S. For instance, a mobile station, PC, laptop computer, a PDA (Personal Digital Assistant) device, or a module thereto may serve as a terminal TE. In the following embodiments, it is assumed that for device management, the terminal TE serves as a device management client and the server S as a device management server. The server S can manage several clients TE.

In the first example of FIG. 1 clients TE and management servers S are connected to a local area network LAN. A client TE connected to the network LAN comprises a functionality, such as a network card and software controlling data transmission, for communicating with the devices in the network LAN. The local area network LAN can be any kind of local area network and TE can also be connected to the server S through the Internet typically using a firewall FW. The terminal TE can also be connected to the local area network LAN wirelessly through an access point AP.

In the second example, the client TE communicates with the server S through a mobile network MNW. A terminal TE connected to the network MNW comprises a mobile station functionality for communicating wirelessly with the network MNW. There may also be other networks, such as a local area network LAN, between the mobile network MNW and the server S. The mobile network MNW can be any wireless network, for instance a network supporting GSM services, a network supporting GPRS (General Packet Radio Service) services, a third-generation mobile network, such as a network according to the network specifications of 3GPP ($3^{rd}$ Generation Partnership Project), a wireless local area network WLAN, a private network, or a combination of several networks. In addition to the examples above, many other device management configurations are also possible, such as a management connection between terminals TE or a direct management connection between the terminal TE and server S by using a wireless or a wired connection with no other network elements.

The terminal TE and the server S comprise memory, a user interface, I/O means for data transmission, and a central processing unit comprising one or more processors. The memory has a non-volatile portion for storing applications controlling the central processing unit and for other information to be stored, and a volatile portion to be used in temporary data processing.

Computer program code portions executed in the central processing unit can cause the server S to implement the inventive means for establishing and managing service contexts in the terminal TE, some embodiments of which are illustrated in connection with FIG. 4a. Computer program code portions executed in the central processing unit of the terminal TE can cause the terminal TE also to implement the inventive means for arranging configurations into the terminal and for arranging use of configurations in the terminal TE, some embodiments of which are illustrated in connection with FIGS. 2, 3, 4a, and 4b. It is to be noted that one or more entities may carry out the inventive functions. For instance, some of the features illustrated in FIG. 3 are carried out by a specific access controller in the terminal TE, whereas some other features are carried out by an application in the terminal TE. The computer program can be stored on any storage medium, from which it can be loaded into the memory of the device TE; S running the computer program. The computer program can also be loaded through the network by using a TCP/IP protocol stack, for instance. It is also possible to use hardware solutions or a combination of hardware and software solutions to implement the inventive means. A chip unit or some other type of module for controlling the device TE and/or S may, in one embodiment, cause the device TE and/or S to perform the inventive functions. A data structure comprising service context specific information can be transferred over a data transmission network, for instance, from the server S to the terminal TE and stored in the memory of the terminal TE.

In one embodiment, the terminal TE and the server S are arranged to support the OMA device management (DM). The terminal TE serving as an OMA device management client comprises a client agent functionality that takes care of functions related to the management session in the client. The server S serving as a device management server comprises a server agent or a server master functionality managing the management session. However, it is to be noted that the application of these functionalities is not limited to any specific devices, and it is even possible that the client and server functionalities are implemented in a single physical device. One or more management trees stored in the memory of TE represents the manageable objects in the terminal TE. The management tree is made up of nodes and it defines at least one management object formed of one or more nodes or at least one parameter of a node. The node can be an individual parameter, a subtree or a data collection. The node may comprise at least one parameter that may be a configuration value or a file, such as a background image file in the node. The contents of the node can also be a link to another node. Each node can be addressed by a uniform resource identifier (URI). An authorized device management server can add (dynamic) and change contents of nodes in the management tree.

Figure 2:
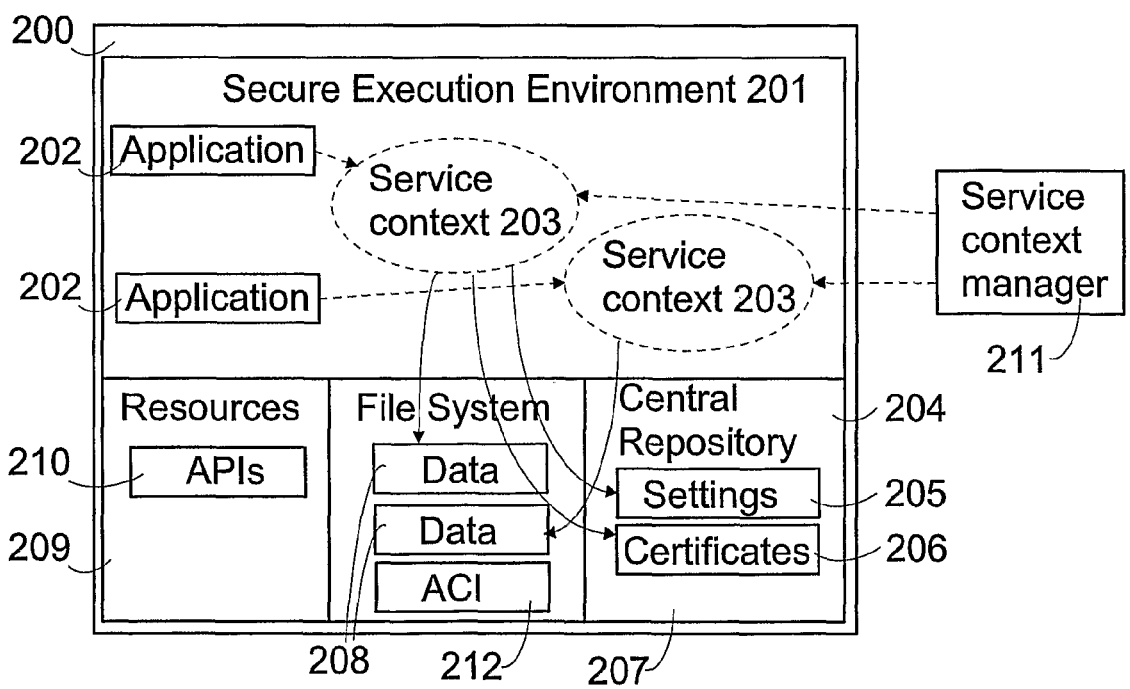
FIG. 2 illustrates a device with multiple configurations.
Figure 3:
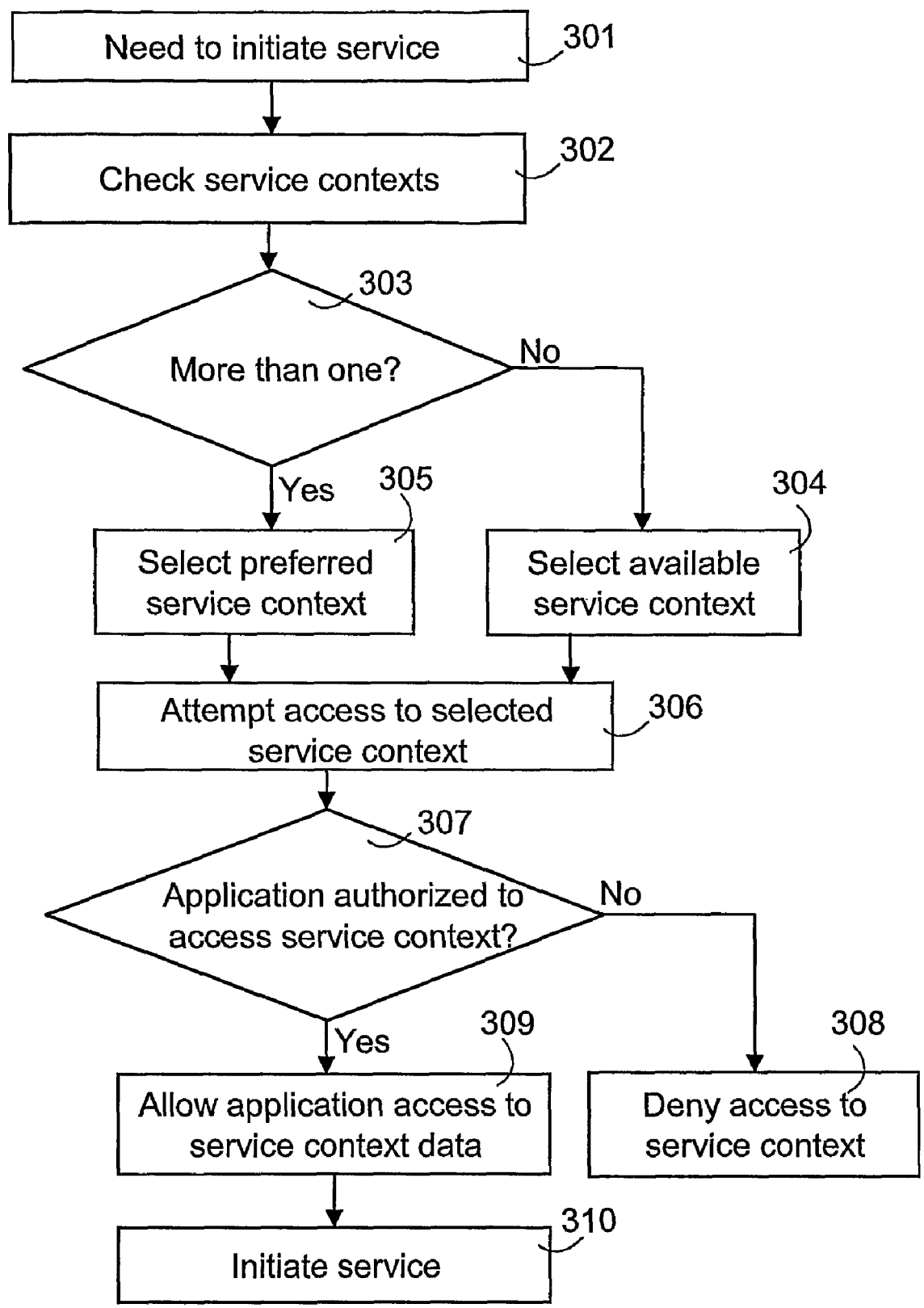
FIG. 3 illustrates a method according to an embodiment of the invention.

FIG. 2 illustrates a terminal TE environment 200 with multiple configurations. The environment 200 is provided with one or more service contexts 203. A service context 203 may be regarded as an area in the terminal TE to which access is controlled. Hence, information stored in a service context specific storage area in the terminal TE may specify or form the service context 203. In one embodiment service contexts 203 represent different configurations in the terminal TE used for accessing services, for instance an Internet access service. As illustrated by arrows from the service context 203, a service context 203 representing a configuration may comprise certificates 206, settings 205, and/or some other type of data 208 specific to the service context. As illustrated in FIG. 2, information belonging to a service context 203 may be stored in multiple storage locations, or in a single storage position. For instance, a service context 203 may comprise or be associated with sensitive user data 208 stored in a file system 207, settings 205 and certificates 206 stored in a central repository 204, which may be a specific storage for service context information. Data 208 belonging to a service context 203 may be any data received in the terminal TE or originated by an application 202. For instance, a user may enter a calendar entry which is stored as data 208 belonging to the service context 203.

A secure execution environment 201 may control access to service context 203 information, and storage positions comprising service context contents may be secured. Although not shown in FIG. 2, the execution environment 201 may comprise an access controller arranged to control access to service context information. An external management entity, in one embodiment of a service context manager 211, may grant rights for applications 202 to access information belonging to a service context 203. Access control information (ACI) 212 originated and/or controlled by the external management entity (211) may be stored in the terminal TE for defining rights to access service contexts 203. Further, the execution environment 201 may attend to securing data transfer between the application 202 authorized to access the service context 203 and one ore more storage positions comprising the service context information. In one embodiment, at least some security services are arranged by an operating system of the terminal TE.

Applications 202 may be executed inside the secure execution environment 201 of the terminal environment 200. Access to one or more service contexts 203 is arranged for an application 202 in order to initiate a service for a user of the terminal TE, if the access control information 212 enables this. This access control information 212 may be defined in many ways in the terminal TE. For instance, a file identifying entities entitled to access a service context 203 may be stored in the terminal TE, and the terminal TE is arranged to provide access to the service context 203 only for entities directly or indirectly identified in the file. The access control information 212 could be defined in terminal TE as parameters for a software component implementing service context access control functions, for instance. Thus, the terminal TE is provided with access control rules for defining entitlement to access a service context 203. The access control information file may be a list of application identifiers or a list of application source identifiers. However, instead of or in addition to application identifiers, the access control information could specify access control information of other entities in the terminal TE, such as application groups or application execution environments. The access control information 212 may be service context or service context group specific. For instance, access control information 212 may comprise a plurality of different profiles for corporate access, tailored for different usage situations. In one embodiment, this administrative access control information 212 belongs to the service context information.

In accordance with an embodiment, a certificate 206 of an application 202 is checked in order to reliably define an identifier associated with the application 202. On the basis of this identifier, the terminal TE is then arranged to check whether or not the application 202 is entitled to access the service context 203. These certificates 206 may be stored within service context information (for instance the certificate 206 in the central repository 204) and/or outside the service context 203, for instance within application 202 data in the file system 207. The certificate 206 is associated with at least one application 202 in the terminal TE. The certificate 206 has been issued and digitally signed by a trusted third party, such as a general certification authority or an application developer, to prove the integrity and source of the associated application 202. The certificate 206 could be obtained for the terminal TE separately from the access control information 212, for instance during installation of application, or it may even form a part of the service context information or access control information from the managing entity. It is to be noted that the certificate 206 may in one embodiment be acquired during the access control procedure for checking the right of the application 206 to access certain service context 203. The certificate 206 may include at least some of the following: a name of the certificate holder, a serial number, an expiration date, a copy of the certificate holder's public key, and the digital signature of the issuer so that a recipient can verify that the certificate is authentic.

As also illustrated by the broken lines in FIG. 2, the service contexts 203 may be managed by the external authorized managing entity 211. This may mean that some or all of the information belonging to the service context 203 may be read, added, modified, and/or removed by the external managing entity 211. In one embodiment, the OMA DM is applied to managing service contexts 203. At least some of the service context 203 information may be stored in a management tree, which is modified by a device management agent on the basis of device management commands from an OMA device management server (S).

FIG. 3 illustrates a method of an embodiment for using service contexts in terminal TE. In step 301, there may be a need to initiate a service by an application 202 such that the application 202 requires information stored under one or more service contexts 203 for service set-up, or for some other purpose. This need typically arises based on a user input, but a service may also be initiated based on some other trigger, such as a command from an external device. Service contexts 203 available for the service may be checked in step 302. If the check 302, 303 reveals more than one available service context 203, a preferred service context 203 is selected 305. For instance, the terminal TE may store a preference list indicating the service contexts 203 in a preference order. A default service context 203 could be selected in step 305. Otherwise, an available service context 203 is selected 304. The application 202, or an application manager, may be adapted to perform steps 301 to 305. Although not shown in FIG. 3, it is to be noted that the service context selection procedure may involve prompting a user of the terminal TE to select a service context and/or to confirm the selection of the service context.

The method then proceeds to step 306, wherein access to a selected service context is requested or a need to access the service context specific data is otherwise indicated. On the basis of access control information 212 from and/or controlled by a managing entity, it is checked 307 whether the application 202 is authorized to access the service context 203. The relevant access control information 212 may be obtained from the memory of the TE, or in one embodiment the terminal TE may be arranged to request and receive access control information from an external entity, such as the external managing entity 212. The managing entity may be the service context manager 211 or some other entity, for instance an entity that has issued the certificate 206. If the application 202 is not authorized, access for the application 202 is denied 308 to the service context 203.

According to an embodiment, step 307 comprises two substeps. First, a certificate 206 associated with the application 202 requiring access to the service context 203 is checked. By checking the certificate 206 it is possible to ensure the integrity and/or source of the application 202. In a second sub-step, an identifier obtained from the application's 202 certificate 206 is compared with identifiers in predetermined access control information 212. An application source identifier from the certificate 206 may in one embodiment be compared in the second sub-step with predetermined application source identifiers in the access control information 212. The access control information 212 in the present embodiment specifies those applications, groups of applications or application sources that are authorized to use the service context 203. Thus, if the identifier from the certificate 206 of the application 202 can be found in the access control information 212, the application is authorized.

If the application 202 is authorized on the basis of a check 307, the application may access 309 information associated with the service context 203, and the application 202 may then initiate 310 the service on the basis of the associated service context information.

In one embodiment, the service context 203 comprises or is associated with settings required for arranging a connection from the terminal TE to one or more network resources for accessing a service. Thus, the application 202 may in step 310 establish a connection using these settings. These settings could specify access to corporate intranet resources, such as an email server and an email account. However, also many other services exist for which the service context 203 may be used.

In an embodiment, the terminal TE comprises access controlled application (specific) data 208 belonging to or associated with a service context 203 such that access to the application data 208 is arranged only for applications 202 authorized by the external managing entity 211. This application data 208 is typically user related and stored by an application 202 in the terminal TE on the basis of a user input. In step 310 the application data 208, such as a file comprising corporate e-mails, may be displayed and possibly further processed by an application 202 (an e-mail client application in this example).

A service context 203 may be selected or defined when using an application 202. A service context 203 may be selected when an application 202 is activated and/or when new contents are to be specified as service context information. For instance, when an e-mail application is activated, the user selects a desired profile or e-mail account, whereby a service context associated with the profile or e-mail account is also selected. Thus, when the application 202 later requires access to service context 203 information, steps 302 to 305 are unnecessary but information in the associated service context 203 may be used, for instance for establishing a connection to a remote e-mail server. In another embodiment, a service context 203 may be specified for a user data item, such as an e-mail message. This service context 203 could be selected in connection with storing of a data item. For instance, when the user has finished preparing an e-mail item and selects to store the item, available service contexts 203 (for the e-mail application) are shown to the user. The user may then select the service context 203 with which the data item is to be associated and thus possibly the storage position of the data item, and the data item is stored accordingly. Later, the data item may be used as any other service context 203 specific data, i.e. access to the data item is allowed only for authorized applications 202.

In one embodiment, access to the service contexts 203 is controlled (steps 307 to 309) by a security procedure in the secure execution environment 201, such as a specific access controller entity. It is also feasible that the execution environment 201 checks 303 and selects 304, 305 a service context 203 for the application 202. A specific service context selector may be provided in the secure execution environment 201.

In another embodiment, service contexts 203 available for the application 202 requiring access to the service context 203 are checked already in step 302. In this embodiment, only service contexts 203 for which the certificate of the application 202 allows access (or for which the application has access authorization by some other means) are considered for the service. In this embodiment, access to a service context 203 is attempted only by authorized applications 202 and unnecessary requests are thus avoided.

Figure 4A:
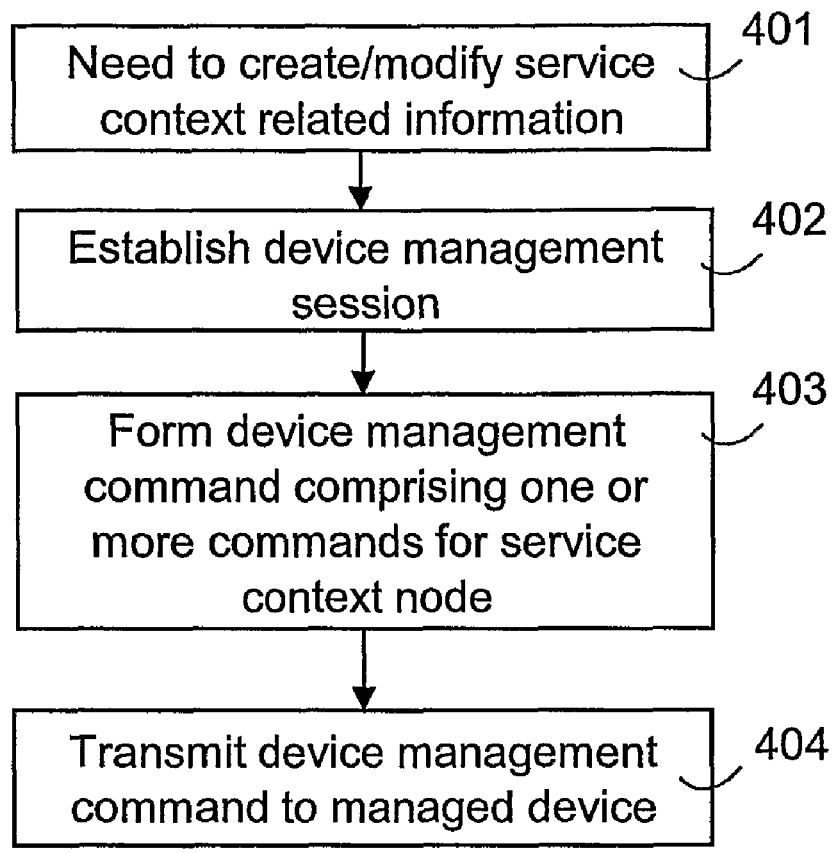
FIGS. 4a and 4b illustrate a method according to an embodiment of the invention.
Figure 4B:
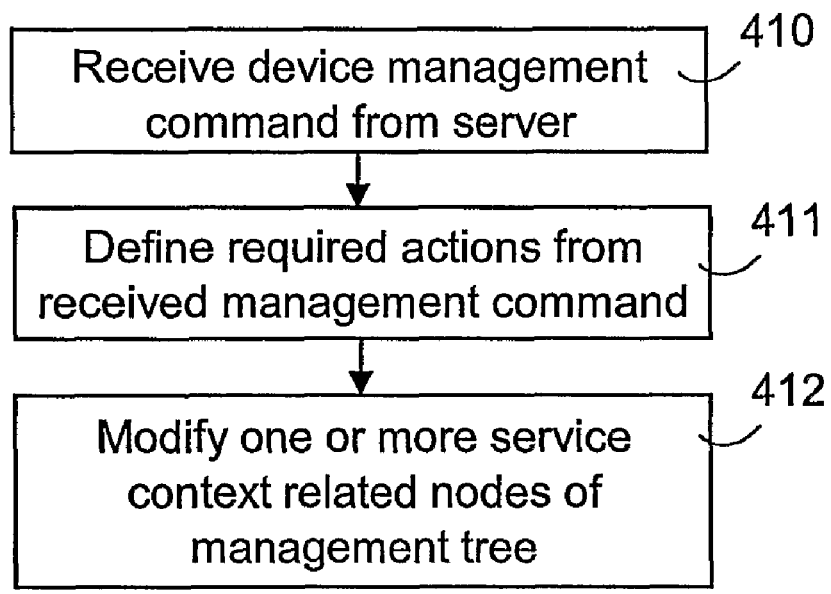

FIGS. 4a and 4b illustrate a method for establishing and/or modifying a service context 203 in the terminal TE by the server S according to an embodiment. In FIG. 4a, features of the server S functioning as the device management server are illustrated. In step 401, a need exists to create a new service context 203 and/or to modify an existing service context 203 in the managed terminal device TE. In another embodiment, a need exists to add or modify access control information 212 related to a service context 203.

A device management session is then arranged 402 between the device management server functionality in the server S and the device management client functionality in the terminal TE. Conventional OMA DM session establishment functions illustrated in the OMA specification "*SyncML Device Management Protocol*", version 1.1.2, 12 Dec. 2003, 41 pages, may be utilized.

Service context related information, for instance connection settings 205, and/or access control information 212, are specified 403 in one or more device management commands. In the present embodiment, at least some of the service context information in the device management command(s) is addressed to one or more service context specific device management tree nodes. The management command is transmitted 404 to the terminal TE.

FIG. 4b illustrates functions in the terminal TE receiving service context related information. In step 410, a device management command is received from a device management server (S). The service context related data, including access control information, may be stored in the terminal TE. More specifically, in step 411 the device management client in the terminal TE defines the required actions on the basis of the received device management command. The device management tree in the terminal TE may then be modified by the new and/or modified information related to the service context 203. For instance, a new node may be added with an ACL list defining the server S as being the only authorized device management server to modify the node. It is to be noted that the management tree may only serve as a view to the managed information, whereby the managed information may be stored outside the management tree.

If the service context 203 is created for the first time and device management has not been provisioned for the terminal TE, OMA client provisioning methods may be used first to initiate and configure the device management before service context specific management commands. Thus, in steps 402 and 410, a connection for arranging provisioning may be utilized.

The management tree may comprise one or more nodes for access control information 212, even if the access control information 212 is not part of the service context 203. In a manner similar to that illustrated above, by utilizing a device management command addressed to a node for access control information 212, it is possible to arrange the modification, deletion, or addition of access control information 212. Thus, an external managing entity may easily change the access control configuration in the managed device TE. It is to be noted that FIGS. 4a and 4b are only exemplary. For instance, the device management command could be formed before the establishment of the management session. In one embodiment, a service context 203 may be created or modified by an authorized party in the terminal TE, for instance a user. Similar procedures as already illustrated in connection with FIG. 3, steps 306-309 may be utilized when accessing service context information. It is thus unnecessary to apply device management mechanisms to modify service context 203 information.

In one embodiment, the service context manager 211 or a service provider, in the embodiment of FIG. 4a the server S, may check that a suitable service context is in place and/or used appropriately in the terminal TE. The service provider may thus check that correct settings are in place and only applications from a trusted source are used. This check could be implemented by using OMA DM GET commands to the nodes comprising this service context data. This embodiment may be implemented after steps 404 and 412 or at some other point of time, for instance after receiving a service request from an application 202 in the terminal TE.

In steps 402, 403, 410, and 411, it is possible to utilize the mechanisms of the device management protocol and the messages defined for it; for a more detailed description of the OMA device management protocol and other commands, for instance, reference is made to the OMA specification "*SyncML Device Management Protocol*", version 1.1.2, 12 Dec. 2003, 41 pages, and the OMA specification "*SyncML Representation Protocol Device Management Usage*", version 1.1.2, 12 Jun. 2003, 39 pages.

In accordance with an embodiment, the contents of a service context 203 may be associated with different access control rules and/or access right levels on the basis of the access control information 212. In a further embodiment, different access rules are applied to different portions of the service context 203. For instance, settings 205 of the service context 203 specifying a connection to a corporate email server may be read (by an application 202 authorized to access the service context 203) but not modified, whereas access to data 208 in a file system 207 associated with the service context 203 may be both read and modified. In this embodiment, the contents of service contexts 203 may be differentiated in respect of access control.

Some exemplary rules that may be applied as the above-illustrated embodiment are: right to read (all or only a specific part of the service context data), right to remove, and right to add. The access control rules and/or right levels may be specified within the access control information 212 or some other storage. In one embodiment, access policies are specified by XACML (Extensible Access Markup Language). If OMA DM is applied, access control lists may be specified in a management tree for determining one or more external device management servers authorized to access associated service context related data, i.e. the external management entities may be specified by OMA DM access control lists.

In an alternative or complementing embodiment, different access control rules are associated with different users of the service contexts 203 on the basis of the access control information 212. In this embodiment, it is possible to apply different access rights for different applications 202 and users of the terminal TE, for instance. As an example, a service context 203 (or part thereof) may be set to be modifiable only by the user of or the subscriber to the terminal TE and an external managing entity originating and/or controlling the service context 203.

In one embodiment, the user of or the subscriber to the terminal TE is always entitled to remove or delete service contexts 203 from the terminal TE. Since a service context 203 is required for obtaining a service, the terminal TE cannot be used for accessing the service after the service context 203 has been deleted. Thus no full control needs to be given for any administrator 211 of a service context 203, and users do not have to give up a right to control their terminals. No service context needs to be forced to any terminal but the user/subscriber may wish to use a service and therefore accept a service context into the terminal TE. Since the service context 203 itself may be set to be modifiable only by the authorized management entity (211), it is possible to prevent access of the user to modify the service context 203.

In a further embodiment, a capability to inform the authorized managing entity 211 about user deleted service contexts 203 is provided. A feature or application 203 handling deletion of a service context 203 on the basis of a user input may be configured to transmit a message to the authorized managing entity 211 informing about the deletion of the service context 203 from the terminal TE. In another embodiment, the authorized managing entity 211 is configured to check the service contexts 203 (which it is authorized to view) in the terminal TE in order to detect deleted ones. For instance, periodic checks may be performed by OMA DM procedures on the nodes comprising service context data.

It should be noted that the embodiments described above could also be applied in any combination thereof. It is apparent to a person skilled in the art that while technology advances, the basic idea of the invention can be implemented in many different ways. The invention and its embodiments are thus not restricted to the examples described above, but can vary within the scope of the claims.

The invention claimed is:

1. A method comprising:
   storing multiple configuration data sets and a plurality of applications in a device,
   checking access control information for defining a right of an application in the device to access a configuration data set in response to an indication from an application in the device requiring access to a configuration data set, and
   in response to the application being entitled to access the configuration data set, on the basis of the access control information, arranging access to the configuration data set for the application, wherein at least one service context is stored in the device, the service context comprising at least the configuration data set, and access to the service context is allowed for the application on the basis of the access control information if the application is authorized on the basis of access control information associated with the service context,
   wherein access control information comprises at least one of information specified by an external entity and information controlled by an external entity.

2. A method as claimed in claim 1, wherein selection of a configuration data set is arranged for the application in response to a plurality of configuration data sets being available for the application.

3. A method as claimed in claim 1, wherein a service is arranged by the application on the basis of at least part of the configuration data set.

4. A method as claimed in claim 1, wherein at least one of the configuration data set and the access control information thereon is arranged into the device by:
   establishing a device management session or a connection for arranging provisioning between a device management server and the device,
   receiving said at least one of the configuration data set and the access control information through the device management session or the connection for provisioning, and
   storing said at least one of the configuration data set and/or the access control information in the device.

5. A method as claimed in claim 1, wherein the service context comprises user related data stored by an application of the device.

6. A method as claimed in claim 1, wherein the configuration data set comprises settings required for arranging a connection from the device to one or more network resources for accessing a service, the method further comprising establishing a connection to one or more network resources on the basis of the settings.

7. A method as claimed in claim 1, wherein data transfer between the application authorized to access the configuration data set and a storage position comprising the configuration data set is secured.

8. A method as claimed in claim 1, wherein access to a configuration data set is controlled on the basis of comparison between predetermined identifiers in the access control information and an identifier in a certificate associated with the application and certifying a source of the application.

9. A device management system comprising a device management server and a device management client to be managed, wherein the device management system is configured to manage at least one device management client by means of a management structure comprising at least one node,
 the system is configured to store access control information originated or controlled by an external managing entity for defining a right of an application in a device comprising the device management client to access a configuration data set,
 the system is configured to check the access control information in response to an indication from an application in the device requiring access to a configuration data set,
 in response to the application being, on the basis of the access control information, entitled to access the configuration data set, the system is configured to provide the application with access to the configuration data set, and
 the system is configured to arrange a service by the application on the basis of at least part of the configuration data set.

10. A data processing device, comprising
 at least one memory including computer program code, and
 at least one processor, wherein the memory and the computer program code are configured to, with the at least one processor, cause the device at least to:
 store multiple configuration data sets and access control information for defining a right of an application in the device to access a configuration data set,
 check the access control information in response to an indication from an application in the device, of a plurality of applications, requiring access to a configuration data set, and
 arrange access to the configuration data set for the application in response to the application being entitled to access the configuration data set, on the basis of the access control information, wherein the data processing device is caused to store at least one service context comprising at least the configuration data set, and
 the data processing device is caused to allow the application to access the service context on the basis of the access control information if the application is authorized on the basis of access control information associated with the service context.

11. A data processing device as claimed in claim 10, wherein the service context comprises user related data stored by an application of the data processing device.

12. A data processing device as claimed in claim 10, wherein the configuration data set comprises settings required for arranging a connection from the device to one or more network resources for accessing a service, and the data processing device is caused, by the memory and the computer program code with the at least one processor, to establish a connection to one or more network resources on the basis of the settings.

13. A data processing device as claimed in claim 10, wherein the data processing device is caused, by the memory and the computer program code with the at least one processor, to arrange selection of a configuration data set for the application in response to a plurality of configuration data sets being available for the application.

14. A data processing device as claimed in claim 10, wherein data transfer between the application authorized to access the configuration data set and a storage position comprising the configuration data set is secured.

15. A data processing device as claimed in claim 10, wherein access to a configuration data set is controlled on the basis of comparison between predetermined identifiers in the access control information and an identifier in a certificate associated with the application and certifying a source of the application.

16. A data processing device as claimed in claim 10, wherein the data processing device comprises a device management client according to an Open Mobile Alliance device management standard, and
 the data processing device is caused, by the memory and the computer program code with the at least one processor, to perform at least one of add a configuration data set and modify a configuration data set on the basis of a device management command received from a device management server to a node of a management tree in the data processing device.

17. A data processing device as claimed in claim 10, wherein the data processing device is caused, by the memory and the computer program code with the at least one processor, to check the access control information in response to a request from the application to access the configuration data set.

18. A data processing device as claimed in claim 10, wherein the data processing device is caused, by the memory and the computer program code with the at least one processor, to arrange a service by the application, based at least in part on the configuration data set.

19. A data processing device, comprising
 at least one processor, and
 at least one memory including computer program code, wherein the at least one memory and the computer program code are configured to, with the at least one processor, cause the data processing device at least to:
 transmit management commands to a managed device, and
 control access control information for defining a right of an application in the managed device to access a configuration data set in the managed device, wherein the access control information controlled by data processing device is associated with at least one service context of the managed device, the service context comprising at least the configuration data set, and the access control information defines the right of the application to access the service context.

20. A data processing device as claimed in claim 19, wherein the data processing device is configured to establish a device management session with the managed device,
 the data processing device is caused to form a device management command addressed to a node representing at least one of the access control information and the configuration data set in a management tree of the managed device, and the data processing device is caused to transmit the device management command to the managed device.

21. A data processing device as claimed in claim 19, wherein the data processing device is a device management server according to the Open Mobile Alliance device management standard.

22. A data storage medium storing a computer program product downloadable into a memory of a data processing device, the computer program product comprising computer program code which, when executed in a processor of the data processing device, causes the data processing device to:
  check access control information for defining a right of an application in the device to access a configuration data set in response to an indication from an application in the device requiring access to a configuration data set, and
  in response to the application being entitled to access the configuration data set, on the basis of the access control information, arrange for access to the configuration data set for the application, wherein at least one service context comprising at least the configuration data set is stored in the data processing device, and
  allow the application to access the service context on the basis of the access control information if the application is authorized on the basis of access control information associated with the service context.

23. A data storage medium according to claim 22, the computer program product comprising computer program code for checking the access control information in response to a request from the application to access the configuration data set.

24. A data storage medium as claimed in claim 22, wherein the service context comprises user related data stored by an application of the device.

25. A data storage medium as claimed in claim 22, wherein the configuration data set comprises settings required for arranging a connection from the device to one or more network resources for accessing a service, the method further comprising establishing a connection to one or more network resources on the basis of the settings.

26. A data storage as claimed in claim 22, wherein the computer program product comprising computer program code for arranging selection of a configuration data set for the application in response to a plurality of configuration data sets being available for the application.

27. An apparatus comprising:
  a transmitter for transmitting device management commands to a managed device,
  a controller for controlling access control information for defining a right of an application in the managed device to access a configuration data set in the managed device, wherein the access control information controlled by the apparatus is associated with at least one service context of the managed device, the service context comprising at least the configuration data set, and the access control information defines the right of the application to access the service context.

28. The apparatus as claimed in claim 27, wherein the apparatus is configured to establish a device management session with the managed device,
  the apparatus is configured to form a device management command addressed to a node representing at least one of the access control information and the configuration data set in a management tree of the managed device, and
  the apparatus is configured to transmit the device management command to the managed device.

29. The apparatus as claimed in claim 27, wherein the apparatus is configured to provide a device management server according to Open Mobile Alliance device management standard.

30. An apparatus comprising:
  means for storing multiple configuration data sets and a plurality of applications,
  means for storing access control information for defining a right of an application in the apparatus to access a configuration data set,
  means for checking the access control information in response to an indication from an application in the apparatus requiring access to a configuration data set, and
  means for arranging access to the configuration data set for the application in response to the application being entitled to access the configuration data set, on the basis of the access control information, wherein the apparatus is configured to store at least one service context comprising at least the configuration data set, and
  the apparatus is configured to allow the application to access the service context on the basis of the access control information if the application is authorized on the basis of access control information associated with the service context.

* * * * *